United States Patent
Hata

(10) Patent No.: US 9,263,922 B2
(45) Date of Patent: Feb. 16, 2016

(54) STEPPING MOTOR HAVING A BAND HOLDING TWO STATOR END PLATES

(71) Applicant: MINEBEA CO., LTD., Kitasaku-gun, Nagano (JP)

(72) Inventor: Masato Hata, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 314 days.

(21) Appl. No.: 13/738,596

(22) Filed: Jan. 10, 2013

(65) Prior Publication Data
US 2013/0221795 A1 Aug. 29, 2013

(30) Foreign Application Priority Data

Feb. 29, 2012 (JP) .................................. 2012-043302
Nov. 14, 2012 (JP) .................................. 2012-250052

(51) Int. Cl.
*H02K 5/15* (2006.01)
*H02K 37/14* (2006.01)

(52) U.S. Cl.
CPC . *H02K 5/15* (2013.01); *H02K 37/14* (2013.01)

(58) Field of Classification Search
None
See application file for complete search history.

(56) References Cited

U.S. PATENT DOCUMENTS

| | | | |
|---|---|---|---|
| 4,597,555 A * | 7/1986 | Weihsmann | 248/672 |
| 5,187,400 A * | 2/1993 | Kurata | 310/49.12 |
| 7,183,676 B2 * | 2/2007 | Mizumaki | 310/49.34 |
| 2002/0047466 A1 * | 4/2002 | Mademba-Sy | 310/238 |
| 2003/0107284 A1 * | 6/2003 | Wickham | 310/91 |
| 2006/0284501 A1 * | 12/2006 | Takagi et al. | 310/81 |
| 2011/0140558 A1 * | 6/2011 | Kinpara et al. | 310/89 |
| 2011/0304225 A1 * | 12/2011 | Terashita et al. | 310/49.37 |

FOREIGN PATENT DOCUMENTS

| | | |
|---|---|---|
| JP | Y-49-46003 | 12/1974 |
| JP | Y2-61-22473 | 7/1986 |
| JP | A-11-275848 | 10/1999 |
| JP | A-2011-125160 | 6/2011 |
| JP | A-2011-135661 | 7/2011 |

* cited by examiner

*Primary Examiner* — Tran Nguyen
(74) *Attorney, Agent, or Firm* — Oliff PLC

(57) ABSTRACT

A stepping motor comprises: a first plate having plural band connection portions; a second plate mounting a band; a stator; and a structure that the stator is held by the first plate and the second plate from a front side and a back side of axial direction, wherein the plural band connection portions are positioned at a side surface of the stator and extend toward the second plate, and each of the plural band connection portions has an engagement portion at an outside thereof, the band has plural arms extending toward the first plate and engaging with the engagement portion of each of the plural band connection portions, and the band is connected to the first plate by engaging the arm portions with the engagement portions in a condition that the band holds the second plate and the stator.

12 Claims, 8 Drawing Sheets

STEPPING MOTOR HAVING A BAND HOLDING TWO STATOR END PLATES

BACKGROUND OF THE INVENTION

1. Field of the Invention

The present invention relates to a stepping motor characterized in a structure connecting a stator to a front plate and an end plate.

2. Description of Related Art

Regarding conventional techniques for a structure connecting a stator to a front plate and an end plate, techniques have been disclosed in Japanese Examined Utility Model (Registration) Application Publication No. S49-46003, Japanese Examined Utility Model (Registration) Application Publication No. S61-22473, Japanese Unexamined Patent Application Publication No. H11-275848, Japanese Unexamined Patent Application Publication No. 2011-125160, and Japanese Unexamined Patent Application Publication No. 2011-135661.

SUMMARY OF THE INVENTION

In conventional structures, it is necessary that members are fixed by welding, adhesion, caulking, or the like, and improvement in production cost is required. In view of these circumstances, it is an object of the present invention to provide a stepping motor in which connecting a stator to a front plate and an end plate can be simply performed by mounting.

According to a first aspect of the present invention, the present invention provides a stepping motor comprising: a first plate having plural band connection portions; a second plate mounting a band; a stator; and a structure that the stator is held by the first plate and the second plate from a front side and a back side of axial direction, wherein the plural band connection portions are positioned at a side surface of the stator and extend toward the second plate, and each of the plural band connection portions has an engagement portion at an outside thereof, the band has plural arms extending toward the first plate and engaging with the engagement portion of each of the plural band connection portions, and the band is connected to the first plate by engaging the arm portions with the engagement portions in a condition that the band holds the second plate and the stator.

In the first aspect of the present invention, in a condition that the first plate, the stator, and the second plate are laminated in the axial direction, the band is mounted from a second plate side, and the arm portion is engaged with the band connection portion. Thus, in a condition that the stator and the second plate are held between the first plate and the band these members are connected. In this structure, the arm portion of the band is engaged with the engagement portion of the first plate, so that the connection condition of the above members is secured. Therefore, the respective members are mounted, and after that, the band potion is simply mounted, so that the stator can be connected to the first plate (for example, a front plate), and the second plate (for example, an end plate).

According to one desirable embodiment (second aspect) of the present invention in the first aspect, positioning of the stator and the first plate and positioning of the stator and the second plate may be performed by fitting a projection into a recess. The recess may have a recess portion into which the projection can be fitted. The recess may be a hole penetrating to a rear side. The recess may have a recessed shape having a bottom.

According to another desirable embodiment (third aspect) of the present invention in the first aspect or the second aspect, positioning of the second plate and the band may be performed by fitting a projection into a recess. In this embodiment of the present invention, the position relationship between the second plate and the band can be determined by a simple structure.

According to another desirable embodiment (fourth aspect) of the present invention in one of the first to third aspects, a claw portion may be provided at one of the band connection portion and the band and a catching portion catching the claw portion may be provided at another of the band connection portion and the band. In this embodiment of the present invention, the claw portion is caught by the catching portion, so that the band can engage with the band connection portion, and the stator can be connected to the first plate and the second plate.

According to another desirable embodiment (fifth aspect) of the present invention in the embodiment (fourth aspect), the claw portion may have a contact portion contacting the catching portion, and the contact portion may have a cross section seen from a circumferential direction, and the cross section of the contact portion of the claw portion may have a tapered shape inclined toward the band so as to be apart from an axial center. In this embodiment of the present invention, influence of lamination part tolerance in the axial direction can be absorbed by the tapered shape portion, and generation of backlash can be inhibited.

According to another desirable embodiment (sixth aspect) of the present invention in one of the embodiments (the fourth and fifth aspects), the claw portion may have a contact portion which contacts the catching portion, and the contact portion of the claw portion may have a cross section seen from a circumferential direction, and the cross section of the contact portion may have a shape whose portion remote from an axial center projects in the axial direction. In this embodiment of the present invention, the portion having the shape projecting in the axial direction can function as a prevention portion of removal of the catching portion, and a structure can be obtained that the engagement condition of the claw portion with the catching portion cannot be easily released.

According to another desirable embodiment (seventh aspect) of the present invention in one of the embodiments (the fourth to sixth aspects), the claw portion may have a contact portion which contacts the catching portion, and the contact portion of the claw portion may have a cross section seen from a circumferential direction, and the cross section of the contact portion may have a shape recessed in the axial direction. In this embodiment of the present invention, the recessed shape can catch the catching portion, so that a structure can be obtained that the engagement condition cannot be easily released. The recessed shape may be one of a V-shape, a concave shape, U-shape, and the like disposed such that the recessed direction is directed in a horizontal direction.

According to another desirable embodiment (eighth aspect) of the present invention in one of the first to seventh aspects, the plural arms may consist of an elastically deformable material, and the plural arms may be elastically deformed, so that the band engaging with the band connection portion can be separated from the band connection portion. In this embodiment of the present invention, the connection of the stator, the first plate, and the second plate can be released by separating the band, and the respective members can be separated.

According to another desirable embodiment (ninth aspect) of the present invention in one of the first to eighth aspects, the stator may have a cylindrical shape, a rotor may be rotatably provided at an inside of the stator having the cylindrical shape, and a rubber washer may be disposed between the rotor and the first plate and between the rotor and the second plate. In this embodiment of the present invention, impacts by axial direction backlash of the rotor with respect to the first plate and the second plate can be absorbed by the rubber washer. Generation of noises in rotation and generation of strange noises by impact from external portions can be inhibited by absorbing the impacts by the rubber washer.

According to another desirable embodiment (tenth aspect) of the present invention in one of the first to ninth aspects, the plural engagement portions and the plural arm portions may be disposed so as to have an equal angle therebetween when the plural engagement portions and the plural arm portions are seen from the axial direction. In this embodiment of the present invention, the structure fixed by the engagement portion with the arm portion can be more stable.

According to another desirable embodiment (eleventh aspect) of the present invention in one of the first to tenth aspects, the stepping motor may have a structure that the stepping motor is mounted to a base member by contacting an end surface of the first plate onto the base member, and the engagement portion may be apart from the end surface of the first plate to a side of the second plate, and leading end portions of the plural arm portions may be positioned so as not to reach the end surface of the first plate. In this embodiment of the present invention, in a structure that the stepping motor is fixed to the base member by contacting the first plate onto the base member, the engagement portion and the leading end of the arm portion cannot interfere with the base member. Since the engagement of the arm portion to the engagement portion can be performed at the side surface of stepping motor, release operation of the engagement condition cannot be disturbed by the base member.

According to the present invention, a stepping motor can be obtained in which the stator can be connected to the first plate (for example, front plate) and the second plate (for example, end plate) simply by mounting.

PREFERRED EMBODIMENTS OF THE INVENTION

Overall Structure

In FIGS. 1A to 5, a stepping motor 100 of an embodiment is shown. The stepping motor 100 is a claw pole type stepping motor. The stepping motor 100 has a structure that a front side stator assembly 200 and an end side stator assembly 300 are connected to each other in an axial direction, as a stator side structure. A rotor 400 shown in FIG. 6 is rotatably provided at an inside of the structure that the front side stator assembly 200 and the end side stator assembly 300 are connected to each other in the axial direction.

Structure of Front Side Stator Assembly 200

Figure 4:
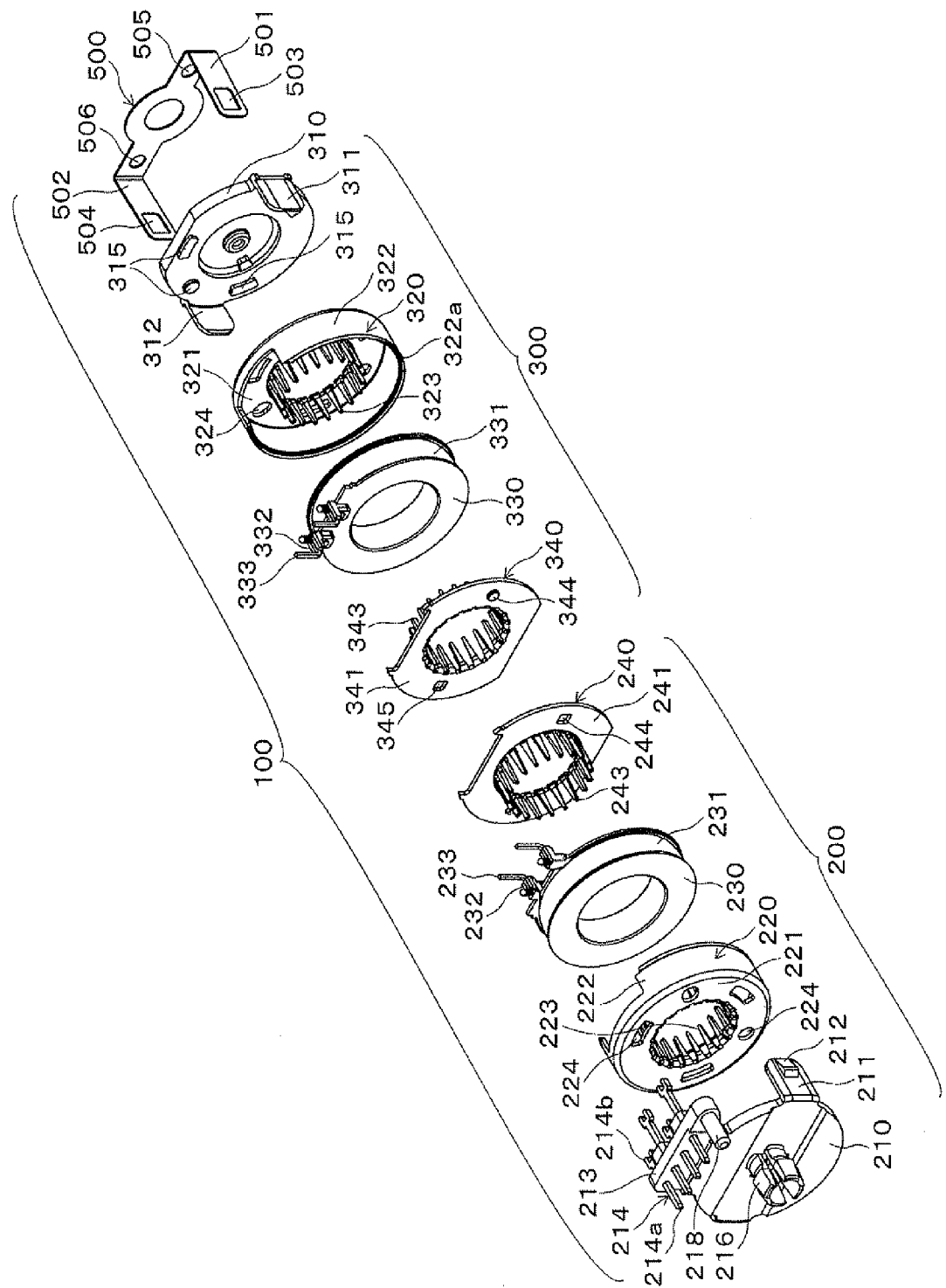
FIG. 4 is an exploded perspective view showing a stepping motor of an embodiment.
Figure 5:
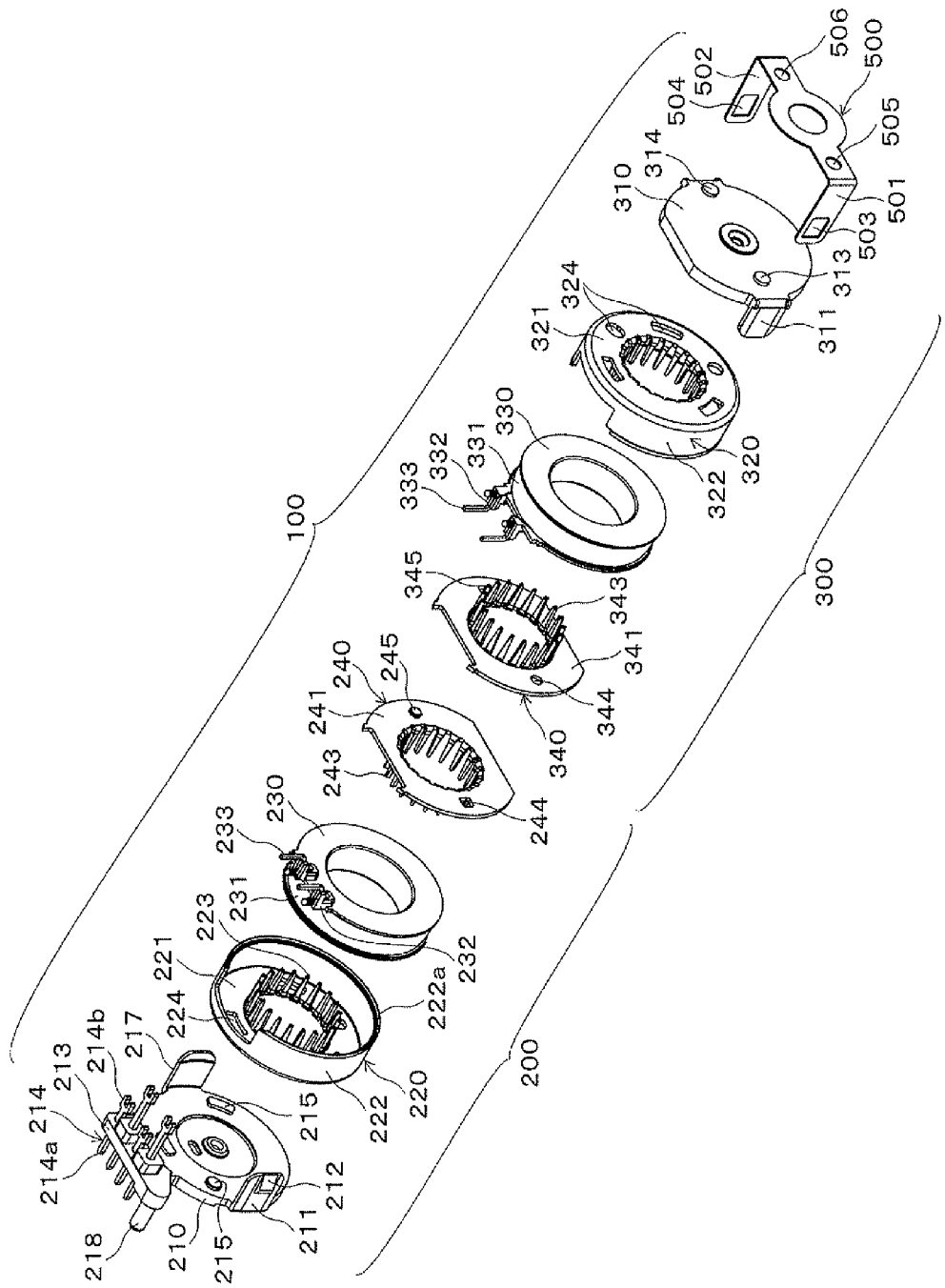
FIG. 5 is an exploded perspective view showing a stepping motor of an embodiment.
Figure 6:
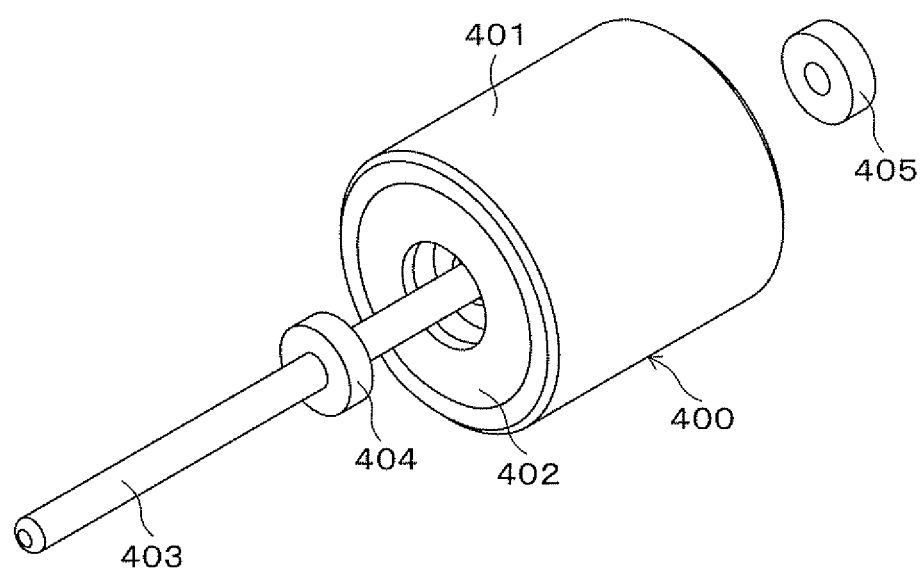
FIG. 6 is a perspective view showing a rotor.

As shown in FIGS. 4 and 5, the front side stator assembly 200 consists of a first plate 210 (illustrated as a front plate), an outside stator 220, a bobbin 230, and an inside stator 240. The first plate 210 is a member having an approximately circular plate shape and forming a front side housing, and is made of an injection-molded resin. The first plate 210 has a band connection portion 211 extending from an edge portion of the approximately circular plate shape in the axial direction. The band connection portion 211 has a claw portion 212. A band connection portion 217 having the same structure as that of the band connection portion 211 is also provided at a side opposite to the band connection portion 211 across an axis. The band connection portion 211 connects a band 500 described below. The axial direction connection condition of the front side stator assembly 200 and the end side stator assembly 300 is secured by connection of the band connection portion 211 to the band 500.

The first plate 210 has a terminal portion 213. Four metallic terminal pins 214 are embedded in the terminal portion 213. Each terminal pin 214 has end portions 214a and 214b. The end portions 214a are connected to a base member (not shown in the Figures). The end portions 214b contact terminals 233 and 333 to which wirings from stator coils 231 and 331 are connected.

Plural bosses 215 are provided on the first plate 210. The bosses 215 are projections projecting toward the outside stator 220 described below, and plural bosses of two different type shapes are used as the bosses 215. The bosses 215 are fitted into hole portions 224 provided at a circular ring portion 221 of the outside stator 220, so that axial direction connection between the first plate 210 and the outside stator 220 is performed, and a rotation prevention structure is obtained for preventing the first plate 210 and the outside stator 220 from relatively rotating around the axis. The hole portions 224 are holes penetrating to a rear side, and function as recesses into which the projected bosses 215 are fitted. Thus, the hole portion 224 may be a recess having a bottom. This is also true of holes other than the hole portion 224.

A base member fixing boss 216 is provided at the first plate 210. The base member fixing boss 216 has plural gaps (slits) formed thereat in the axial direction. The base member fixing boss 216 is fitted into a hole of the base member (not shown in the Figures), so that the stepping motor 100 is fixed to the base member (not shown in the Figures). When the stepping motor 100 is fixed to the base member (not shown in the Figures) by using the base member fixing boss 216, the end portions 214a of the four terminal pins 214 contact the base member, and the four terminal pins 214 are connected to a wiring pattern on the base member by solder. Reference numeral 218 denotes a positioning pin for positioning the stepping motor 100 to the base member. The positioning pin 218 is fitted into a positioning hole provided at the base member, so that positioning of the stepping motor 100 to the base member is performed.

The outside stator 220 is a section functioning as a stator in which a magnetic path is formed, and the outside stator 220 is made of a magnetic material (electromagnetic soft iron, rolled steel plate, or the like). The outside stator 220 has the circular ring portion 221, an outer cylindrical portion 222, and plural pole teeth 223. The circular ring portion 221 has a flat plate shape. The outer cylindrical portion 222 has a cylindrical shape extending in the axial direction from an outer edge of the circular ring portion 221. The plural pole teeth 223 extend in the axial direction from an inner circumference side edge of the circular ring portion 221, and are disposed so as to be spaced from each other in a circumferential direction.

The bobbin 230 is made of a resin, and the stator coil 231 is wound around the bobbin 230. The bobbin 230 having the stator coil 231 wound therearound is disposed at a doughnut shaped space (ring shaped space) between the outer cylindrical portion 222 of the outside stator 220 and the plural pole teeth 223. The bobbin 230 has terminal portions 232 formed at two positions. The metallic terminal 233, to which an end portion of winding wire of the stator coil 231 is connected by lock-wiring, is embedded in each terminal portion 232. The end portions 214b of two of the four terminals 214 contact the two metallic terminals 233.

The inside stator 240 is made of the same material as that of the outside stator 220, and has a circular ring portion 241 and plural pole teeth 243. The circular ring portion 241 has a flat plate shape. The plural pole teeth 243 extend in the axial direction from an inner circumference side edge of the circular ring portion 241, and are disposed so as to be spaced from each other in the circumferential direction. An outer edge of the circular ring portion 241 contacts an inner circumference surface of the outer cylindrical portion 222 of the outside stator 220. A step portion 222a is provided at an inside of edge portion of the outer cylindrical portion 222 of the outside stator 220. The step portion 222a is contacted by an outer edge of the circular ring portion 241. The circular ring portion 241 is fitted into the outer cylindrical portion 222, and a structure is obtained that the outer edge of the circular ring portion 241 and the inner circumferential surface of the outer cylindrical portion 222 reliably contact each other.

In a condition that the inside stator 240 is mounted to the outside stator 220, the plural pole teeth 223 and 243 are positioned at an inside (axial center side) of the bobbin 230, and engage with each other so as to be spaced from each other and be next to each other. A hole portion 244 is provided at the circular ring portion 241 of the inside stator 240, and a boss 344 of the end side stator assembly 300 is fitted into the hole portion 244. The boss 344 is fitted into the hole portion 244, so that the axial direction connection between the front side stator assembly 200 and the end side stator assembly 30 is performed and the rotation prevention structure is obtained for preventing the front side stator assembly 200 and the end side stator assembly 300 from relatively rotating around the axis. A boss 245 (shown in FIG. 5) is provided at a position opposite to hole portion 244 across the axis. The boss 245 is fitted into a hole portion 345 (shown in FIG. 4) of the end side stator assembly 300.

Structure of End Side Stator Assembly 300

As shown in FIGS. 4 and 5, the end side stator assembly 300 consists of an second plate 310 (illustrated as an end plate), an outside stator 320, a bobbin 330, and an inside stator 340. The outside stator 320 is the same section as the outside stator 220. The outside stator 320 is used in a condition that the direction of the outside stator 320 is opposite to that of the outside stator 220 in the axial direction. The bobbin 330 is the same section as the bobbin 230. The bobbin 330 is used in a condition that the direction of the bobbin 330 is opposite to that of the bobbin 230 in the axial direction. The inside stator 340 is the same section as the inside stator 240. The inside stator 340 is used in a condition that the direction of the inside stator 340 is opposite to that of the inside stator 240 in the axial direction.

The second plate 310 is a member having an approximately circular plate shape and forming an end side housing, and is made of an injection-molded resin. The second plate 310 has a band contact portion 311 contacting an arm portion 501 of the band 500 from an inside. The band contact portion 311 contacts the arm portion 501 from the inside and supports the arm portion 501 from the inside such that the arm portion 501 is deformed and not removed from the first plate 210 after assembling. A band contact portion 312 having the same function as that of the band contact portion 311 is also provided at a side opposite to the band contact portion 311 across the axis.

Bosses 313 and 314 (shown in FIG. 5) are provided at a side of the second plate 310 proximate to the band 500. The bosses 313 and 314 are fitted into hole portions 505 and 506 provided at the band 500. Bosses 315 are provided at a side of the second plate 310 proximate to the outside stator 320. Plural bosses 315 of two different type shapes are disposed. The bosses 315 are fitted into hole portions 324 provided at the outside stator 320.

The outside stator 320 has a circular ring portion 321, an outer cylindrical portion 322, and plural pole teeth 323. The circular ring portion 321 has a flat plate shape. The outer cylindrical portion 322 has a cylindrical shape extending in the axial direction from an outer edge of the circular ring portion 321. The plural pole teeth 323 extend in the axial direction from an inner circumferential side edge of the circular ring portion 321, and are disposed so as to be spaced from each other in the circumferential direction.

The bobbin 330 is made of a resin, and the stator coil 331 is wound around the bobbin 330. The bobbin 330 having the stator coil 331 wound therearound is disposed at a space between the outer cylindrical portion 322 of the outside stator 320 and the plural pole teeth 323. The bobbin 330 has two terminal portions 332. The metallic terminal 333, to which an end portion of winding wire of the stator coil 331 is connected by lock-wiring, is embedded in each terminal portion 332. The end portions 214b of two of the four terminals 214 contact the two metallic terminals 333.

The inside stator 340 is made of the same material as that of the outside stator 320, and has a circular ring portion 341 and plural pole teeth 343. The circular ring portion 341 has a flat plate shape. The plural pole teeth 343 extend in the axial direction from an inner circumferential side edge of the circular ring portion 341, and are disposed so as to be spaced from each other in the circumferential direction. An outer edge of the circular ring portion 341 contacts an inner circumferential surface of the outer cylindrical portion 322 of the outside stator 320. A step portion 322a is provided at an inside of edge portion of the outer cylindrical portion 322 of the outside stator 320. The step portion 322a is contacted by the outer edge of the circular ring portion 341.

In a condition that the inside stator 340 is mounted to the outside stator 320, the plural pole teeth 323 and 343 are positioned at an inside of the bobbin 230, and are engage with each other so as to be spaced from each other and be next to each other. The boss 344 and the hole portion 345 are provided at the circular ring portion 341 of the inside stator 340. The boss 344 is fitted into the hole portion 244 of the front side stator assembly 200. The boss 245 of the front side stator assembly 200 is fitted into the hole portion 345.

Band

The band 500 is a member having an approximately U-shape and made of a metallic material having elasticity. The band 500 has the holes 505 and 506 provided at a portion contacting a back surface of the second plate 310. The boss 313 provided at the back surface of the second plate 310 is fitted into the hole portions 505. The boss 314 provided at the back surface of the second plate 310 is fitted into the hole portions 506. The band 500 has the arm portion 501 and an arm portion 502, extending in the axial direction, at both ends of the band 500. A rectangular hole portion 503 is provided at the arm portion 501. The claw portion 212 of the band connection portion 211 is caught by the hole portion 503, so that the band connection portion 211 and arm portion 501 engage with each other. In the same manner, a rectangular hole portion 504 is provided at the arm portion 502. A claw portion (not shown in the Figures) of the band connection portion 217 of the first plate 210 is caught by the hole portion 504 and engages with the hole portion 504.

In this condition, seen from the end plate side (from the perspective shown in FIG. 1B), leading ends of the arm portions 501 and 502 are positioned so as not to reach an end surface (exposed surface) of the first plate 210 and the engagement portion of the arm portion 501 to the band connection portion 211 is also positioned so as not to reach the end surface (exposed surface) of the first plate 210. That is, the leading ends of the arm portions 501 and 502 and the engagement portion of the arm portion 501 to the band connection portion 211 are positioned so as to be apart from the end surface (exposed surface) of the first plate 210 in a direction to the second plate 310. This position relationship is true of another engagement portion (not shown in FIG. 1).

The angle between the arm portions 501 and 502, seen from the axial direction, is the same as the angle between the band connection portions 211 and 217. In this case, the angle is set at 180 degrees. The angle, seen from the axial direction, between the arm portions 501 and 502 is the same as the angle between the band connection portions 211 and 217, so that the fixing structure using the band 500 can be stable. For example, when a structure is used that arm portions and band connection portions are provided at three positions, it is desirable that each of angles between the arm portions and angles between the band connection portions be set as 120 degrees.

Rotor

Figure 2:
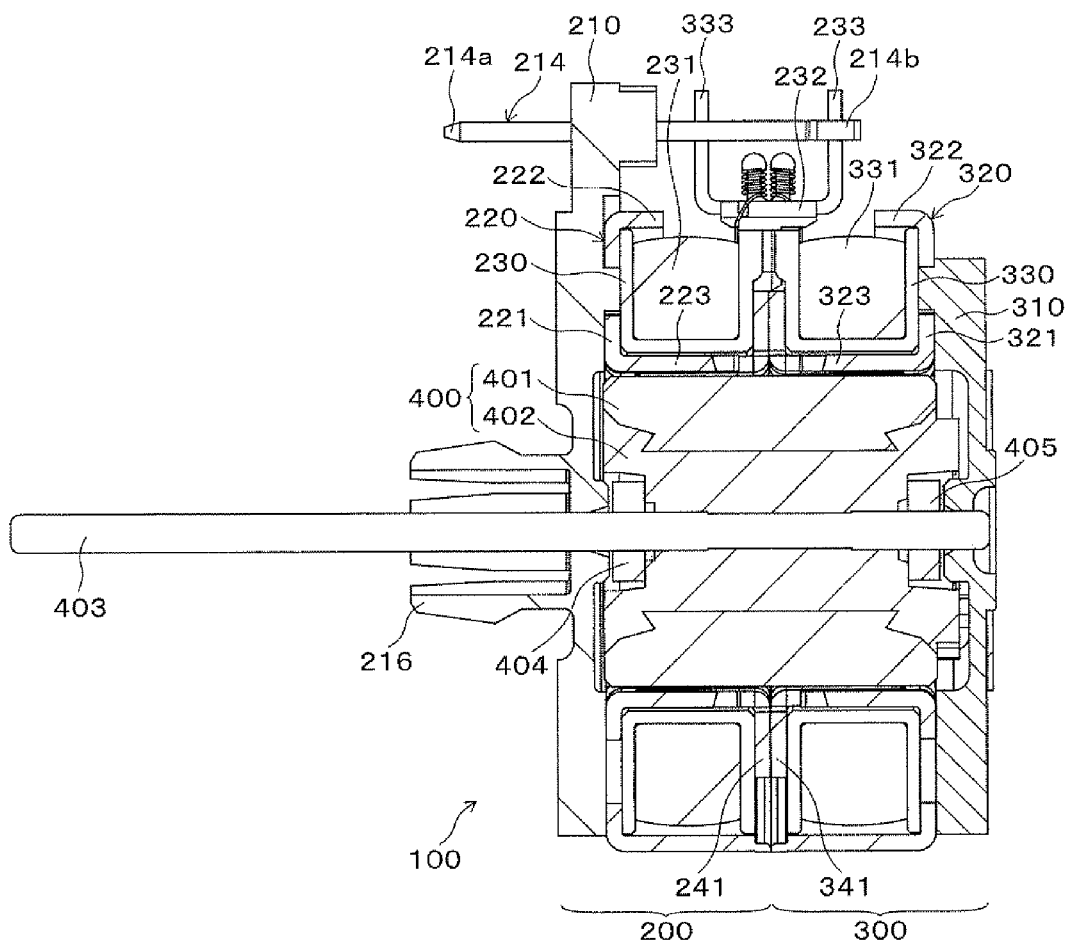
FIG. 2 is a side cross sectional view showing a stepping motor of an embodiment.

The rotor is shown in FIG. 6. The rotor 400 has a rotor magnet 401 having a cylindrical shape. The rotor magnet 401 is fixed at an outer circumference of a rotor member 402, and has a magnetic pole structure that magnetization is performed such that north pole (N), south pole (S), north pole (N) and south pole (S) are alternately formed in the circumferential direction. A shaft 403, which is a rotational shaft, is fixed at the axial center of the rotor 400 (rotor member 402). As shown in FIG. 2, the shaft 403 passes through holes provided at the first plate 210 and the second plate 310, and directly contacts an inner circumferential surface of the holes so as to be rotatably supported by the inner circumferential surface functioning as a bearing. The shaft can be also rotatably held by the first plate 210 and the second plate 310 via a bearing device (a bearing or the like).

As shown in FIG. 2, rubber washers 404 and 405, made of rubber and having a cylindrical shape, are provided at the shaft 403. The rubber washer 404 is disposed between the rotor 400 and the first plate 210, and the rubber washer 405 is disposed between the rotor 400 and the second plate 310. Impacts by axial direction backlash in the rotor 400 are absorbed by the rubber washers 404 and 405.

Examples of Assembling Process

One example of an assembling process for the stepping motor 100 will be explained hereinafter. For example, as shown in FIGS. 4 and 5, the stator coil 231 is wound around the bobbin 230 in advance, and lock-wiring is also performed onto the terminal 233 in advance. This is also true of the bobbin 330. The front side stator assembly 200 and the end side stator assembly 300 are assembled.

First, the outside stator 220 and the inside stator 240 are connected to each other via the bobbin 230 in the axial direction. Next, the outside stator 220 and the first plate 210 are connected to each other in the axial direction. In this case, the boss 215 (see FIG. 5) is fitted into the hole portion 224 (see FIG. 4), the positions of the outside stator 220 (and the inside stator 240) and the first plate 210 around the axis are adjusted, and the rotation prevention structure for preventing relative rotation around the axis is obtained. Thus, the front side stator assembly 200 shown in FIG. 3 is obtained.

The outside stator 320 and the inside stator 340 are connected to each other via the bobbin 330 in the axial direction. Next, the outside stator 320 and the second plate 310 are connected to each other in the axial direction. In this case, the boss 315 (see FIG. 4) is fitted into the hole portion 324 (see FIG. 5), the positions of the outside stator 320 (and the inside stator 340) and the second plate 310 around the axis are adjusted, and the rotation prevention structure for preventing relative rotation around the axis is obtained. Thus, the end side stator assembly 300 shown in FIG. 3 is obtained.

Figure 3A:
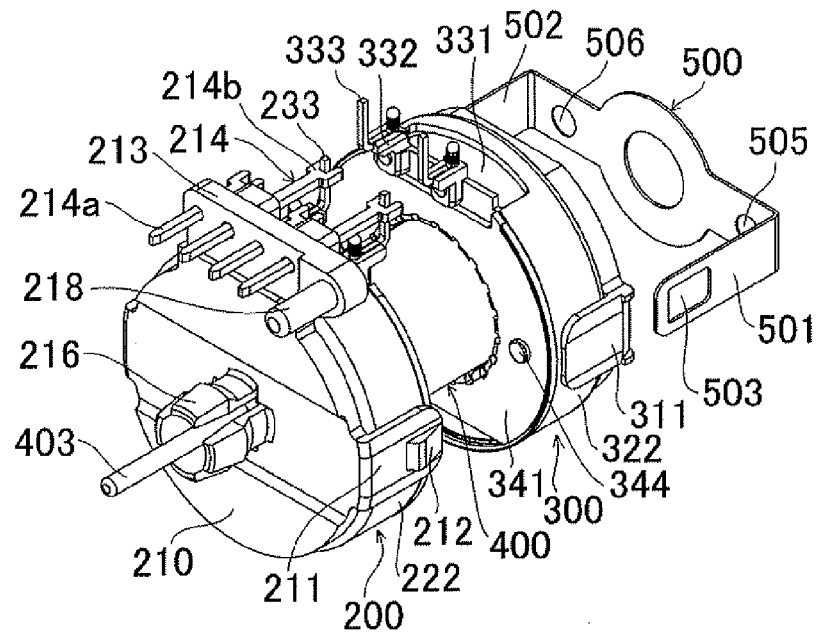
FIGS. 3A and 3B are exploded perspective views showing a stepping motor of an embodiment.
Figure 3B:
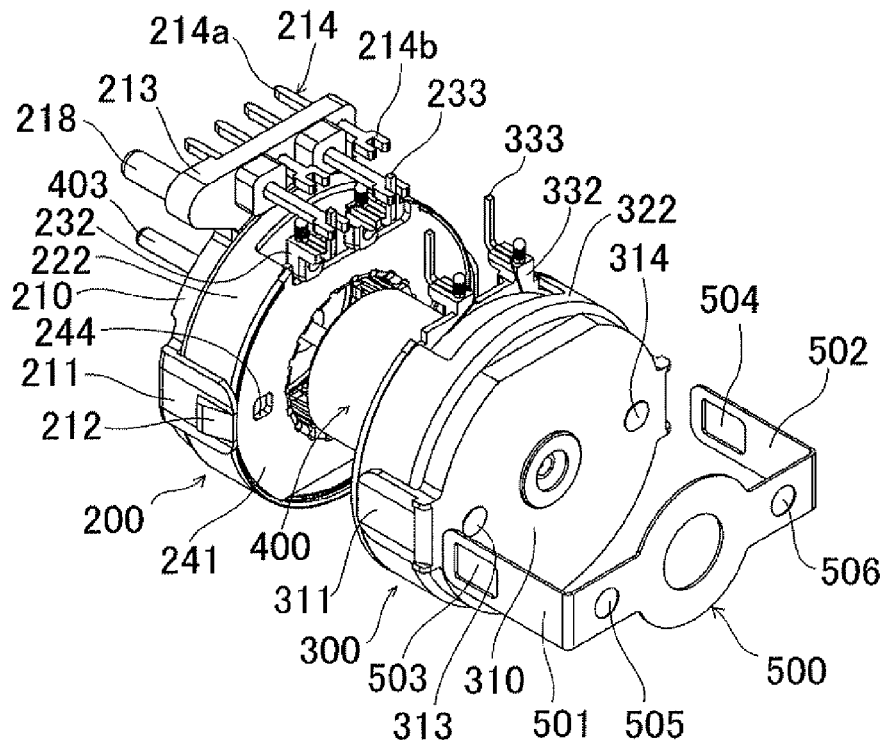

Next, as shown in FIGS. 3A and 3B, the front side stator assembly 200 and the end side stator assembly 300 contact each other in the axial direction in a condition that the rotor 400 is provided inside the front side stator assembly 200 and the end side stator assembly 300. In this case, the boss 344 is fitted into the hole portion 244, the boss 245 is fitted into the hole portion 345 (see FIGS. 4 and 5), the positions of the front side stator assembly 200 and the end side stator assembly 300 around the axis are adjusted, and the rotation prevention structure for preventing relative rotation around the axis is obtained. As shown in FIGS. 3A and 3B, the band 500 is provided from the side of the end side stator assembly 300, and the claw portion 212 is caught by the inside edge of the hole portion 503, and engages therewith. The same engagement is also performed at the hole portion 504. Thus, the structure shown in Figs. 1A and 1B, that each member of the stator is held and integrated between the band 500 and the first plate 210 is obtained.

Advantages

Figure 1A:
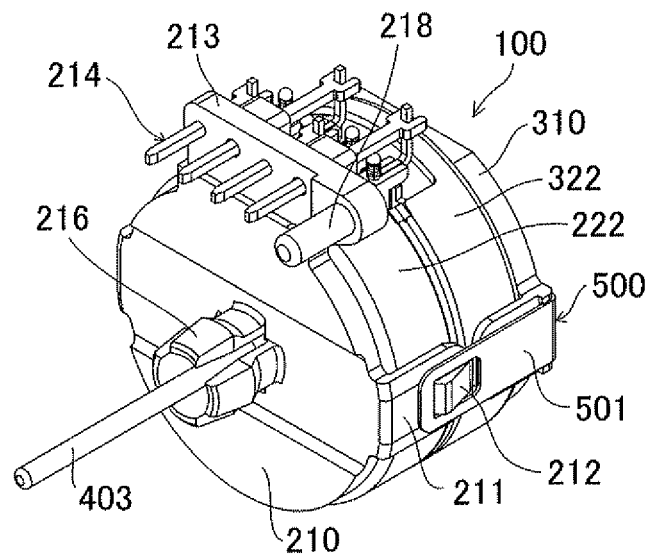
FIGS. 1A and 1B are perspective views showing a stepping motor of an embodiment.
Figure 1B:
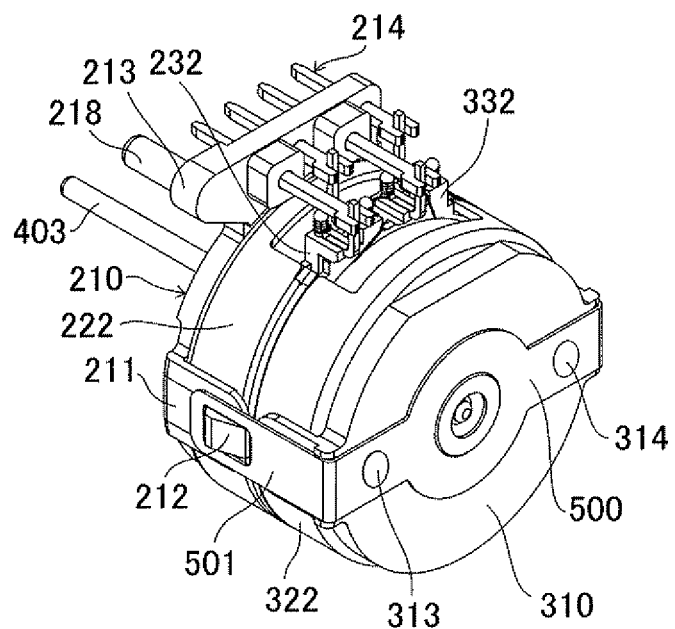

The respective members are mounted and the band 500 is provided finally, so that the structure shown in FIGS. 1A and 1B is obtained. In this case, a fixing process using welding and a fixing process using caulking are not necessary, and the condition, that each member contacts and is connected, is secured finally by mounting the band 500 thereto. Thus, production process for stepping motors can be simplified, and working apparatuses for welding and caulking are not necessary. In particular, the structure of the band 500 is simple, so that a structure, which can be reliable assembled with high accuracy, can be obtained.

In particular, the bosses are fitted into the hole portions, so that the structures for position adjustment and rotation prevention can be obtained. Thus, position relationship between the respective members can be accurately determined by a simple production process that it is only necessary to mount parts in sequence. Since the band 500 is elastic, the band 500 can be separated after assembling is performed once. The band 500 is separated, so that the respective members, simply contacting, can be separated, and replacement of parts and recycling of parts can be easy. For example, in a condition that the stepping motor 100 is mounted to the base member, the band 500 can be separated, and the rotor 400 can be ejected from the stepping motor 100.

Since the stepping motor 100 can be directly mounted to the base member, the space for the stepping motor 100 can be reduced. The rubber washers 404 and 405 are used, so that impacts by axial direction backlash are absorbed. For example, the stepping motor 100 can be used for driving of meters, and in this case, strange noises, which may be caused by impact from external portions, can be absorbed by functions of the rubber washers 404 and 405.

Since the claw portion 212 is provided so as to be apart from the end surface of the first plate 210 in the axial direction, in a condition that the first plate 210 contacts the base member so as to be pressed toward the base member, a structure is obtained that the claw portion 212 and the arm portions 501 and 502 of the band 500 do not interfere with electronic parts on the base member, and space for mounting parts on the base member can be secured. Seen from the end plate side (from the perspective shown in FIG. 1B), the leading ends of the arm portions 501 and 502 are positioned so as not to reach the end surface (exposed surface) of the first plate 210 so that in a condition that the first plate 210 contacts the base member so as to be pressed toward the base member, the engagement of the arm portion 501 to the band connection portion 211 can be released, and the band 500 can be separated.

Modification Examples

Figure 7A:
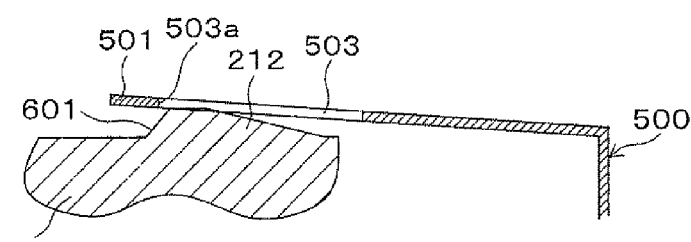
FIGS. 7A to 7G are conceptual diagrams showing a structure of a claw portion and an action thereof.
Figure 7B:
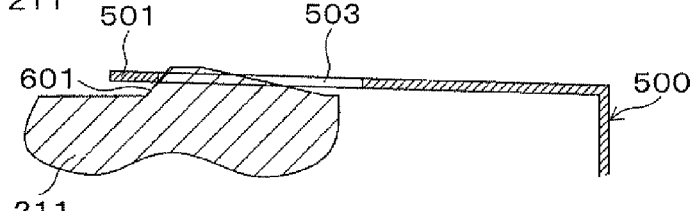
Figure 7C:
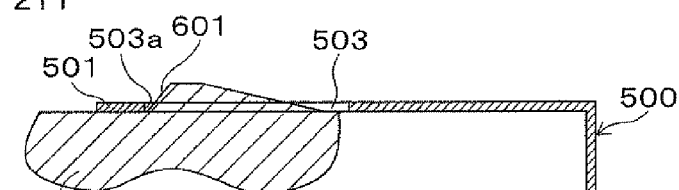

Modification examples of the claw portion 212 will be explained hereinafter. FIGS. 7A to 7G are conceptual diagrams showing a condition of the engagement of the claw portion with the arm portion seen from the circumferential direction. FIGS. 7A to 7C show an example that a tapered shape portion 601 is used as a portion of the claw portion 212 contacting an edge 503a of the hole portion 503 of the arm portion 501. The tapered shape portion 601 has a shape that a cross section of the tapered shape portion 601 seen from the circumferential direction has a shape inclined toward the band 500 so as to be apart from the axial center. In this structure, as shown in FIGS. 7B and 7C, even when this structure has an influence of lamination part tolerance in the axial direction, this influence is absorbed by the tapered shape portion 601, and generation of backlash can be inhibited. That is, even when this structure is in the condition shown in FIG. 7B or Fig.7C due to lamination part tolerance in the axial direction, since the tapered shape portion 601 is an inclined surface, the engagement condition that the hole portion 503 catches the claw portion 212 can be maintained.

Figure 7D:
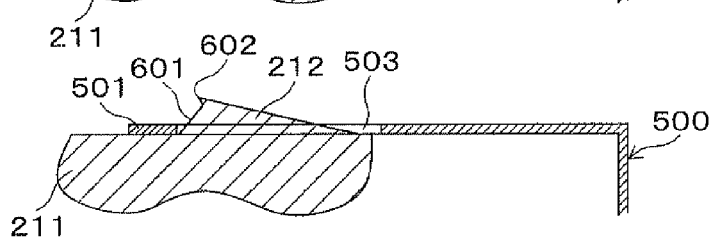

FIG. 7D shows an example of a structure that a return portion 602 projecting in the axial direction is provided at a portion remotest from the axial center. A structure is obtained that the engagement condition that the hole portion 503 catches the claw portion 212 cannot be easily released by providing the return portion 602.

Figure 7E:
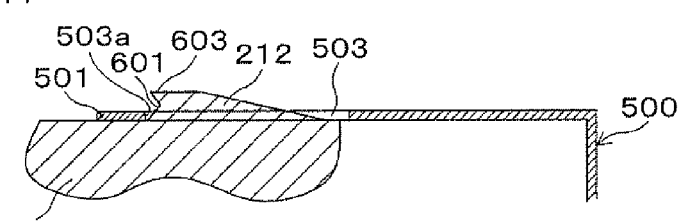
Figure 7F:
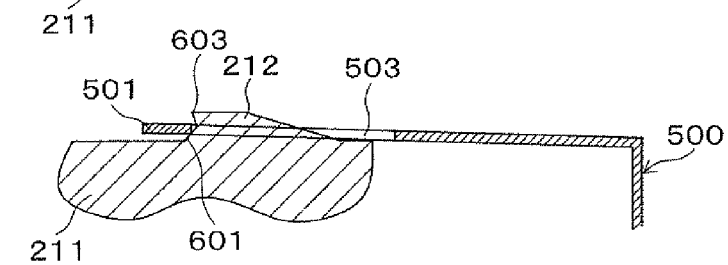

FIG. 7E shows an example of structure that a return portion 603 is provided. The return portion 603 has an axial direction projection length set to be longer than that of the return portion 602. FIG. 7F shows a condition in which the leading end of the arm portion 501 is spaced slightly from the band connection portion 211 due to lamination part tolerance in the axial direction, from the condition shown in FIG. 7E. Even in this case, the leading end of the arm portion 501 moves along the inclined surface of the tapered shape portion 601, so that as shown in FIG. 7F, the engagement condition of the claw portion 212 and the hole portion 503 is maintained.

Figure 7G:
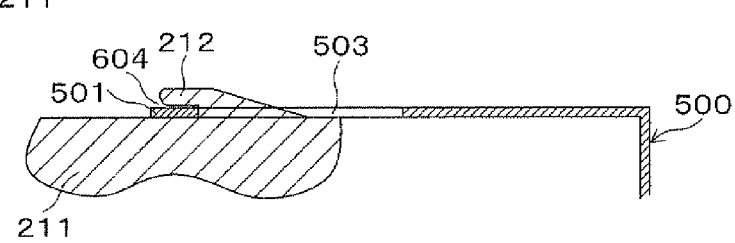

FIG. 7G shows an example of structure that a recess portion 604 recessed in the axial direction is provided at the claw portion 212. In this case, the leading end of the arm portion 501 is caught in the recess portion 604 and engages therewith. This structure is also the structure that the engagement condition of the claw portion 212 and the hole portion 503 cannot be easily released. In the case shown in FIGS. 7D and 7E, a structure that a recess is formed below the return portions 602 and 603 by providing the return portions 602 and 603 can also be understood.

Figure 8:
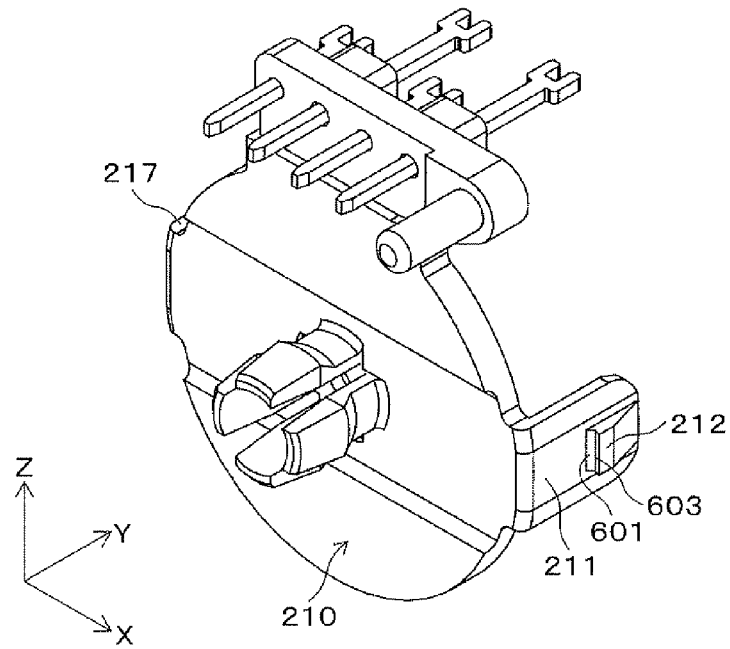
FIG. 8 is a perspective view showing a structure of another example of a front plate.
Figure 9:
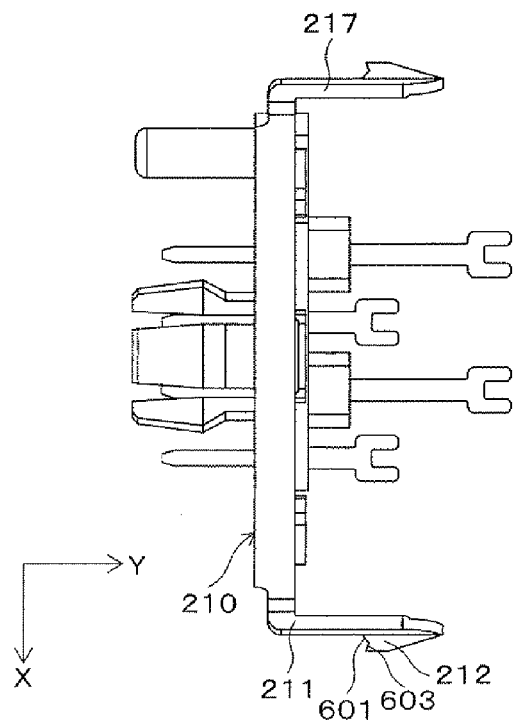
FIG. 9 is a plane view showing a structure of another example of a front plate.

FIG. 8 shows an example of the first plate 210 having the claw portion 212 having the structure shown in FIG. 7E. FIG. 9 is a plane view showing the first plate 210 of FIG. 8 seen from the negative direction of the Z-axis. In FIGS. 7A to 8, the structures other than the claw portion 212 are the same as those explained by using Figs. 1A and 1B and 3A to 5. In the examples shown in FIGS. 8 and 9, the band connection portion 217 of the first plate 210 also has the same structure of the claw portion as that of the band connection portion 211.

Another Modification Structure

The outside stators 220 and 320 may have a notch portion. After the bosses 313 and 314 of the second plate 310 are fitted into the hole portions 505 and 506, the bosses 313 and 314 may be welded to the band 500. In the example shown in the Figures, the band 500 engages with the first plate 210 at two positions and is fixed thereat, and alternatively, the same engagement structure can be used at three or more positions. Claw portions can be also disposed at the band contact portions 311 and 312 at the side of the second plate 310, and the band can be mounted from the front side, so that the entire structure can be secured. Claw portions can be also provided at the insides of the arm portions 501 and 502 of the band 500, and portions catching the claw portions can be provided at the band connection portions 211 and 217.

Features of the present invention are not limited to the respective embodiments described above, and also include various modifications which can be made by the one skilled in the art, and effects by the present invention are not limited to the ones described above. That is, various additions, various modifications, and various partial omissions can be made within the range of the conceptual scope and effects of the present invention obtained from the invention as claimed in the claims and equivalents thereof.

The present invention can be used for stepping motors.

What is claimed is:

1. A stepping motor comprising:
a stator having a first and a second stator assemblies that are coupled to each other in an axial direction;
a rotor rotatably disposed inside the stator and having a rotor magnet and a shaft;
a band having axially extending arm portions, wherein a first engagement portion is provided at each of the arm portions;
a first plate disposed on the first stator assembly and having axially extending band connection portions, wherein a second engagement portion is provided at each of the band connection portions; and
a second plate disposed on the second stator assembly and having axially extending band contacting portions for supporting the arm portions of the band;
wherein the band is attached to the second plate, each of the arm portions is disposed on each of the band contacting portions, and
each of the arm portions of the band is engaged with each of the band connection portions at an outside of the stator.

2. A stepping motor according to claim 1, wherein the stator has a projection or recess, the first plate has a recess or projection, the second plate has a projection or a recess, and corresponding projections are fitted into corresponding recesses.

3. A stepping motor according to claim 1, wherein the second plate has a projection or a recess, the band has a recess or projection, and a corresponding projection is fitted into a corresponding recess.

4. A stepping motor according to claims 1,
wherein the second engagement portion is a claw portion, and the first engagement portion is a hole to engage the claw portion.

5. A stepping motor according to claim 4, wherein
the claw portion has a contact portion contacting the first engagement portion, and
the contact portion of the claw portion has a cross section seen from a circumferential direction, and the cross section of the contact portion has a tapered shape inclined toward the band so as to be apart from an axial center.

6. A stepping motor according to claim 4, wherein
the claw portion has a contact portion contacting the first engagement portion, and
the contact portion of the claw portion has a cross section seen from a circumferential direction, and the cross section of the contact portion has a shape whose portion remote from an axial center projects in the axial direction.

7. A stepping motor according to claims 4, wherein
the claw portion has a contact portion contacting the first engagement portion, and
the contact portion of the claw portion has a cross section seen from a circumferential direction, and the cross section of the contact portion has a shape recessed in the axial direction.

8. A stepping motor according to claim 1, wherein
the arm portions are made of an elastic material.

9. A stepping motor according to claim 1, wherein
two rubber washers are respectively disposed between the rotor and the first plate, and are disposed between the rotor and the second plate.

10. A stepping motor according to claim 1, wherein
the second engagement portions and the arm portions are disposed so as to have an equal angle therebetween when the second engagement portions and the arm portions are seen from the axial direction.

11. A stepping motor according to claim 4, wherein
the claw portion has a cross section seen from a circumferential direction, and the cross section of the claw portion has a slope upwardly inclined toward the first plate, the arm portion is made of an elastic material, wherein when an end portion of the arm portion passes through the slope, the arm portion elastically returns and the hole moves toward the claw portion and engages therewith.

12. A stepping motor according to claims 1, wherein the band contacting portion has projections that restrict circumferential movement of the arm portion.

* * * * *